Figure 1:
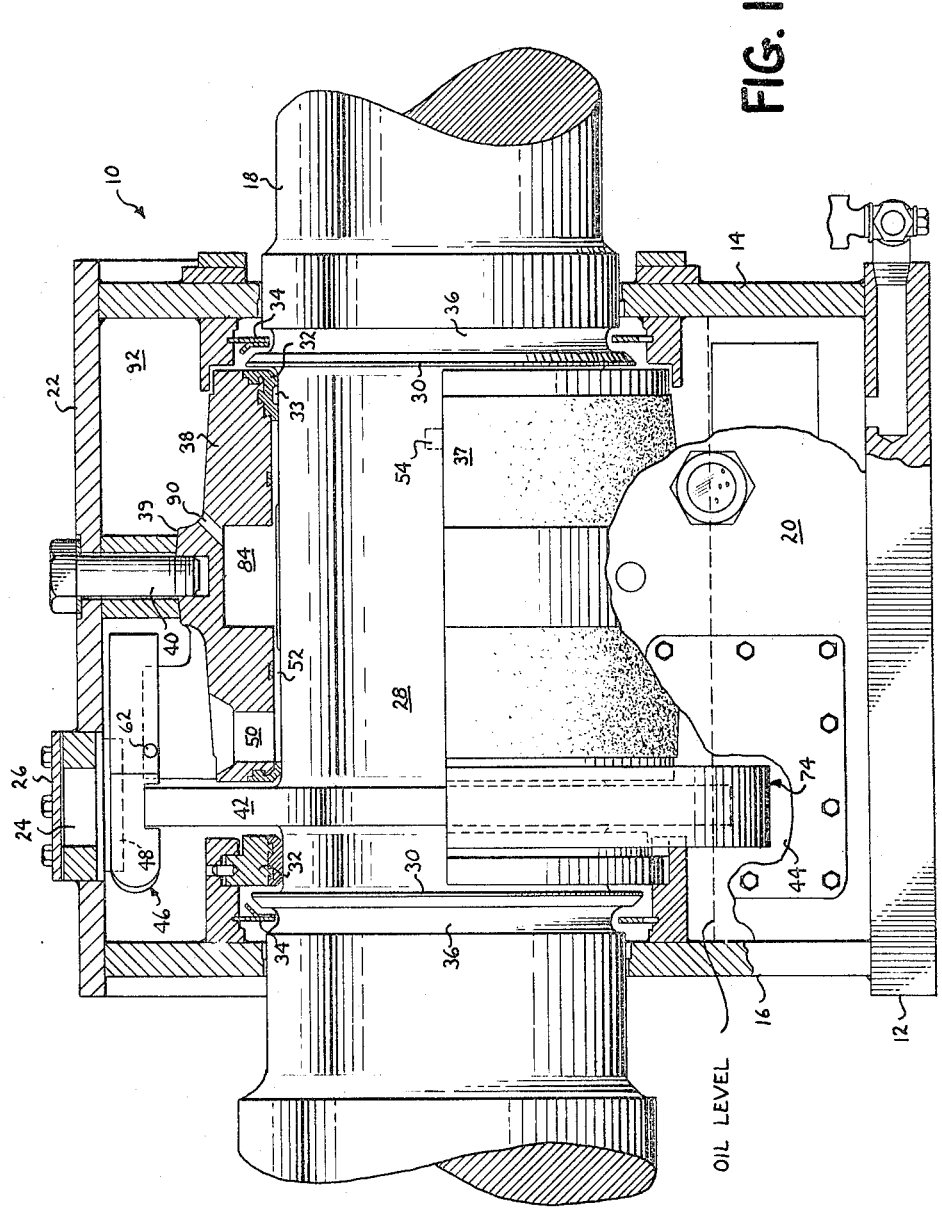

Dec. 27, 1966   T. C. JOHNSON   3,294,457
SELF-LUBRICATING BEARING
Filed April 29, 1964   3 Sheets-Sheet 1

INVENTOR.
THERON C. JOHNSON
BY James L. Campbell
HIS ATTORNEY

INVENTOR.
THERON C. JOHNSON
BY
*James R. Campbell*
HIS ATTORNEY

United States Patent Office 3,294,457
Patented Dec. 27, 1966

3,294,457
SELF-LUBRICATING BEARING
Theron C. Johnson, Schenectady, N.Y., assignor to General Electric Company, a corporation of New York
Filed Apr. 29, 1964, Ser. No. 363,408
7 Claims. (Cl. 308—127)

The invention described herein relates to bearings and more particularly to a self-lubricating bearing of the type useful with large rotating machinery.

Pedestal type journal bearings having self-lubricating features normally lift the lubricating oil from a sump to the top of a bearing by different kinds of devices, such as a disc shrunk or otherwise fitted on the shaft adjacent the journal. Although these well known constructions provide for adequate cooling and lubrication of a bearing in the relatively low speed ranges, they are not effective in performing the same function at higher speeds. In those cases where attempt is made to operate the same bearing at such higher speeds, that bearing becomes starved of oil and the temperature rises quickly to dangerous levels. As a result, forced feed lubrication systems are resorted to for furnishing the necessary quantity of oil to the bearing. Since the present bearings include design features which permit their operation at both higher loads and speeds, it is evident the need exists for an improved self-lubricating construction which will extend the speed range without having to use a more costly forced feed system.

In conducting tests on a conventional bearing of 7" diameter and 7" length and including an oil lifting disc, it was found the bearing design provided remarkably good lubrication below about 600 r.p.m., but at speeds greater than about 700 r.p.m., the lubrication became marginal, then inadequate, and became progressively worse as the speeds were increased. Curves made from the data obtained showed that at normal oil levels, the temperature rose as a function of speed and load.

The usual constructions allow about ¾" to 1" of disc immersion during shaft rotation and close examination of the oil flow patterns shows the disc causes the oil to be splashed off the lower half of the pedestal vertical walls thus causing severe oil agitation rather than being carried upwardly in a uniform flow pattern to the top of the pedestal cap in the region where the bearing entrance port is located. Such lack of uniformity in the flow results in a tendency for the oil to move generally in close contact with the walls of the sump in the region of the disc with little tendency to move upward to the top of the bearing. It therefore has little if any opportunity to reach the oil scraper at the top of the disc which normally directs the oil into a bearing entrance port for subsequent flow between the rotating parts.

Increasing the speed results in amplified splashing and agitation of the oil with consequent non-useful circulation in the sump. The volume of oil thus carried by the disc upwardly to the bearing does not appreciably increase, whereas, as is well known in the art, the quantity of oil needed to be supplied to the load carrying film should increase at least linearly with speed.

The inadequacy of the conventional self-lubrication systems at the higher speeds is even more evident when the oil level is lowered to about ¼" of disc immersion. Under these conditions, and even though great agitation of the oil takes place in the sump, the oil actually directed into the bearing entrance port becomes critically meager. Increasing the oil level about ½" above the nominal 1" of disc immersion results in such greatly increased oil agitation in the sump that there exists a greatly increased tendency for oil to climb over the various restraining baffles around the shaft and escape from the pedestal axially at the point where the shaft enters the pedestal. The leakage oil constitutes a hazard to rotating electrical machinery and is otherwise undesirable.

The scraper usually rests on the disc and out of contact with the inner surface of the pedestal housing. Because of the centrifugal forces and velocities involved, a thin layer of oil is moved by the disc along the inner peripheral surface of the pedestal and in a position radially outward from the disc. Since no impediment is provided near the top of the bearing to splash or direct the oil down into the bearing entrance port, because the scraper is out of contact with the pedestal inner surface, the oil slips by the scraper and therefore is not delivered to the bearing to carry out its lubricating and cooling functions.

Another phenomenon which occurs in conventional bearings is that air normally bubbles out of the oil entrance port at the top of the bearing this impeding the flow of lubricant into and between the rotating parts. This phenomenon is caused by air being drawn into the bearing through oil over-flow holes on opposite ends of a horizontal axial groove provided at the horizontal split of the bearing. As the shaft turns, air is drawn through the over-flow holes and carried upward to the top of the bearing to the axial oil distribution groove at the top of the bearing which communicates with the entrance port. Since the only outlet for the air is through the entrance port, in opposition to the in-flow of oil, an impediment is established to the unrestricted oil flow into the entrance port. At higher speeds the amount of air drawn in is increased thereby causing an even greater impediment and further reducing the already meager oil supply to the bearing.

It therefore is apparent the need exists for an improved design of self-lubricating bearing having a lubrication system sufficient to enable the application of varying loads and speeds throughout a wide range with the confidence the bearing will be both lubricated and cooled at the desired levels.

The primary object of my invention therefore is to satisfy this above identified need.

Another object of my invention is to provide an improvd scraper arrangement for directing the desired quantity of oil into a bearing.

Still another object of my invention is to provide an oil directing device designed for coaction with the rotating disc for channeling lubricating oil upwardly in a desired flow path prior to contact with the scraper.

Another object of my invention is to provide an arrangement for venting air from the inner parts of a bearing.

In carrying out my invention, I provide an improved self-lubricating bearing of the type utilizing a disc for moving oil from a sump or reservoir to the top of a bearing to perform a lubricating and cooling function. A deflector coacting with the disc directs the lubricant in the desired flow path towards the top of the bearing and an improved design of scraper appropriately located near the lubricant entrance port is employed for diverting the maximum quantity of oil into the bearing. To permit unimpeded flow of oil to the rotating parts, an air venting arrangement purges entrapped air from the bearing through an air outlet different than the oil inlet passageways. It will be apparent to those skilled in the art that in view of the function performed by the different bearing components, they may assume any one of a number of different configurations.

Figure 2:
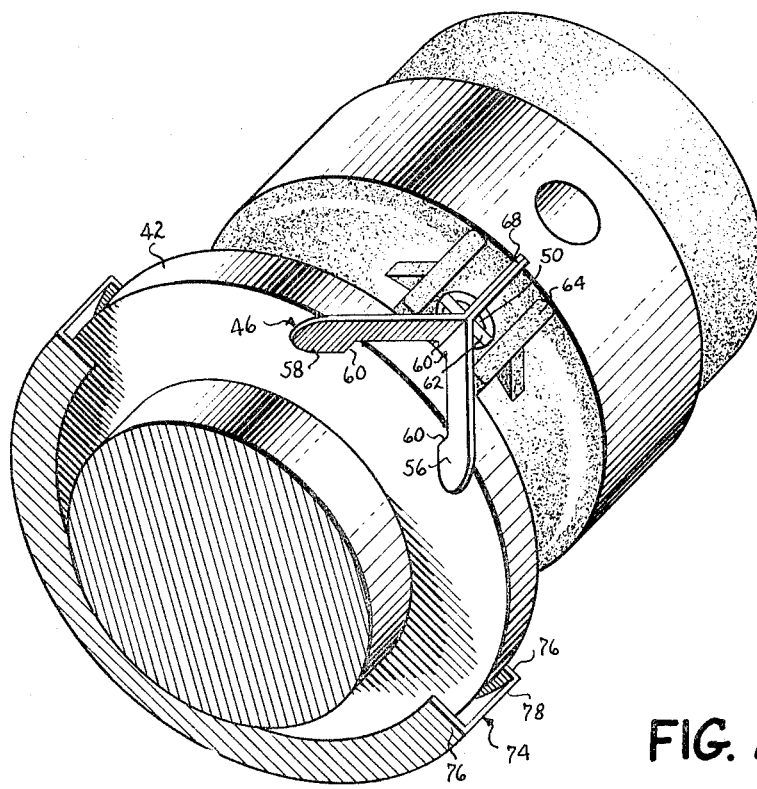
Figure 4:
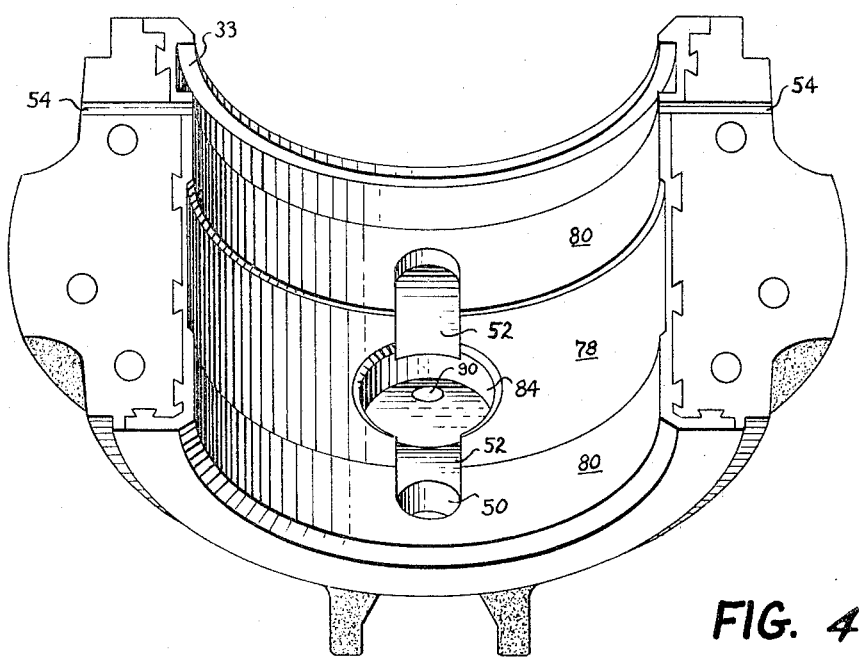
Figure 3:
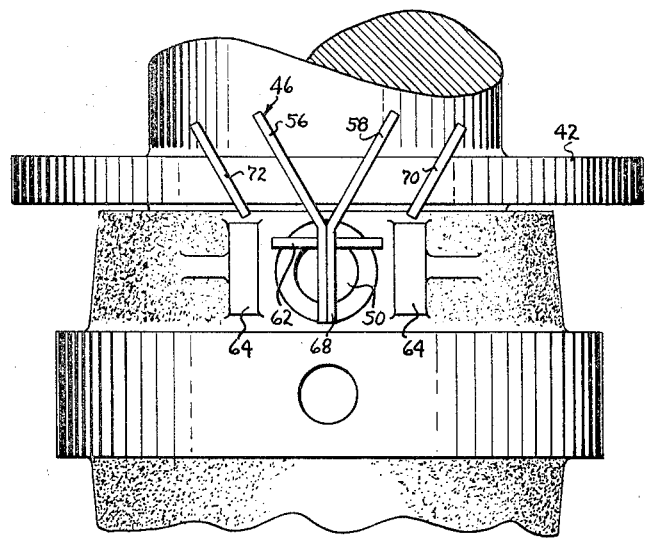

While the specification concludes with claims particularly pointing out and distinctly claiming the subject matter which I regard as my invention, it is believed the invention will be better understood from the following description taken in connection with the accompanying drawings in which:

FIGURE 1 is a view in elevation, partly in section, of a self-lubricating bearing illustrating the various improvements of this invention;

FIGURE 2 illustrates an improved design of scraper used in wiping oil from the rotating disc, FIGURE 3 is a diagrammatic showing of the scraper arrangement including diverter baffles on the inside of the pedestal cap for directing oil into a bearing entrance port; and FIGURE 4 is a perspective view of the top half of a bearing cap illustrating the arrangement of the air separation chamber with its bleed-off hole for venting entrapped air to the atmosphere.

Referring now to the drawings wherein like reference characters designate like or corresponding parts throughout the several views, there is shown in FIGURE 1, the standard components of a self-lubricated journal bearing incorporating the novel features of this invention. The bearing consists of a pedestal 10 having a base 12 supporting oppositely disposed end plates 14 and 16 having centrally disposed openings for receiving a shaft 18 in the usual manner.

The pedestal is split in conventional fashion along the shaft horizontal center line and is closed by a cover or cap 22 fastened to the lower part 20 of the pedestal by bolts (not shown) or other securing means. An observation port 24 covered by a plate 26 is preferably formed in the upper cap 22.

As in conventional constructions, the shaft is equipped with a journal 28 having outwardly projecting flanges 30 on opposite ends thereof which coact with oil retaining members 32 and ring type baffles 34 respectively projecting into grooves 36 on opposite ends of the journal to form a labyrinth seal effective in preventing the displacement or flow of oil axially outward from the bearing. The bearing also includes lower and upper shells 37 and 38 having their inner surfaces coated with babbitt or other soft metallic materials as is customary in the art. The bearing shells may be positioned axially and radially by the ball-seal bearing support 39, and are prevented from rotating relative to the pedestal by a dowel or other means, such as a bolt 40, extending through the pedestal cover 22 and terminating in the upper shell 38. The threads thus provided for the bolt are useful in removing the upper bearing shell when the bearing is dismantled for maintenance or repair.

A disc 42 disposed on the shaft at one end of the journal has its lower portion immersed in about ¾" to 1" of oil located in a sump 44 in the usual manner. During operation, as the disc rotates with the shaft, oil is lifted from the sump 44 by the disc to a combined scraper 46 and deflector 48 positioned near the top of the bearing, as more fully described hereafter. These parts are appropriately shaped to a configuration effective in removing oil from the disc and directing it into an entrance port 50 for introduction into the relatively rotating parts in the bearing. The oil then is permitted to flow axially through an axially extending groove 52 formed in the upper bearing shell to be uniformly distributed between the bearing shells 38 and journal surfaces.

With rotation of the shaft, the oil is carried from the axial distribution groove 52 downward to an axial pocket or reservoir (not shown) in the lower bearing shell 20 at the horizontal split between upper and lower bearing shells. Oil is drawn as needed from the reservoir into the load carrying film between journal surface 28 and lower bearing shell 20. The pressure in the load carrying film squeezes oil axially out of the bearing, some passing toward the disc and thence dropping to the sump 44 and an equal amount passing in the opposite direction to the oil collection groove 33 where it drops to the sump through drain holes, (not shown).

Excess oil in the reservoir at the horizontal split not needed for the bearing oil film is drained into the sump through a groove 54 formed in the lower edge of the upper bearing shell 38. Since the over-flow port 54 is at the opposite end of the pedestal from the disc, the excess oil which exits through port 54 assists in stirring and circulating oil throughout the entire sump volume, thereby enhancing cooling of the bearing and pedestal by ensuring a circulation of hot oil. It is evident that within reason, the larger the quantity of excess oil that exits through port 54, the greater the stirring of oil in the sump and the tendency to improve heat transfer.

Referring now to FIGURE 2 illustrating the improved scraper 46 of the invention, it will be seen it comprises a pair of blades 56 and 58 with an end portion 68 at the point where they join to form a device of Y-shape configuration. The device may be formed of a pair of plates suitably bent and bolted together or employ constructions of other simple designs.

As shown, the opposite ends of each blade are equipped with shoulders 60 designed to permit the scraper to float freely on the upper surface of disc 42. A pin 62 projects outwardly from each side of the scraper in a circumferential direction and is arranged to contact stop members 64 (only one shown in FIGURE 2) disposed on an outer surface of the upper bearing shell 38. The oil entrance port 50 is located immediately beneath the end portion 68 of the joined scraper blades 56 and 58.

FIGURE 3 illustrates the arrangement of the scraper with respect to the disc 42, pin 62, stops 64, and the oil entrance port 50. As indicated previously, the scraper is loosely mounted on the disc and is prevented from moving axially thereon by the shoulders 60 while circumferential movement is restricted by the pin 62 as it contacts either of the stops 64 depending on the direction of rotation. The weight of the parts prevents the scraper from moving radially outward through that small distance between the scraper and the pedestal cap inner surface.

The end portion 68 extends from the joining of the blades axially to a point close to the ball-seat support 39 of the bearing, allowing suitable clearance for manufacturing tolerances and the necessary end-play of the shaft in the pedestal. The end portion serves to further direct oil into the entrance port 50 and prevent oil from escaping past the entrance port in the space between the blades and the ball-seat support.

Since the disc 42 rotates at a high velocity, a substantial quantity of oil will be thrown out into contact with the cap inner surface to be carried circumferentially upward to the top of the bearing. The scraper however is spaced from the pedestal cap and much of that oil slips by it and is not directed into the lubricant entrance port 50. To positively assure diverting such oil into the entrance port, a pair of diverter baffles 70 and 72 are welded to the pedestal cap inner surface and in the general position illustrated in FIGURE 3. When viewed from the side as shown in FIGURE 1, it will be seen they overlap the scraper and therefore will be contacted by oil flowing along the inside surface of the cap. The baffles are directed towards the oil entrance port 50 for changing the direction of oil flow into the port prior to delivery to the bearing. Since the inner surface of the diverter baffles are spaced from the disc, that oil carried upwardly by the disc and not engaged by the baffles, impinges against the surface of either plate 56 or 58 and accordingly is directed into the oil entrance port. With this arrangement, it is evident the maximum quantity of oil will be delivered to the bearing.

Referring to FIGURE 2, it will be seen a channel shaped diverter 74 secured to the lower pedestal is positioned outwardly from the disc but in concentric relationship therewith. It serves to channel the oil in a direction toward the disc as the disc lifts the oil upwardly during its rotating movement. The channel shaped diverter includes a pair of semi-circular rings 76 welded or otherwise secured to a cylinder 78. The oppositely disposed ends extend approximately up to the split of the pedestal but the side walls of the rings 76 overlap a small portion of the disc, although such overlap is not essential to successful operation. With the diverter in position, and the disc rotating, the side walls effectively perform the function of channeling the flow of oil concentric to the disc, rather than away from it, thereby liberally coating the disc with oil, as well as forcing it to flow along the inner surface of the pedestal cap, concentric with the disc, thus permitting the disc to cause the oil to be carried to the scraper and baffles for depositing it in the oil entrance port 50.

Referring to the upper bearing cap illustrated in FIGURE 4, it will be seen that the central portion 78 is relieved while the babbitted portions 80 on opposite sides thereof are designed for contact with the shaft journal surface. The oil drain groove 33 is more clearly shown as well as the over-flow groove 54 in the bearing shell for draining excess oil to the sump. The air separation chamber 84 is formed in the central portion of the shell and includes a pair of communicating grooves extending axially outward in opposite directions therefrom to form the oil distribution groove 52. Oil is introduced into the groove 52, FIGURE 1, through the inlet port 50 for distribution axially along the shell and then circumferentially in that space between the babbitted shell surface and the exposed journal surface on the shaft. To bleed air entrapped in the oil, a vent opening or passageway 90 is formed in the central part of the separation chamber 84 and terminates in the space 92, FIGURE 1, between the bearing shell and the inner surface of the pedestal. With this arrangement, any air in the system will gravitate towards the highest point in the bearing structure and become separated from the oil and flow upwardly through the air bleed-off hole 90 to be vented to the atmosphere.

OPERATION

With the sump filled with oil to a level sufficient to immerse the bottom-most point of the disc to approximately 1″, and the shaft rotated, the disc 42 picks up oil and lifts it by frictional and centrifugal force to the upper part of the bearing. As the shaft accelerates, the channel shaped diverter located in the bottom of the pedestal housing causes the oil to be directed back into contact with the sides of the rotating disc for flow circumferentially upward to the scraper and baffle located in the upper part of the housing. Since the disc surface is moving at a relatively high velocity, some of the oil is thrown outwardly into contact with the pedestal housing and moves upwardly by centrifugal force in a path towards the upper part of the bearing. Since the scraper and diverter baffles overlap, any oil which moves into contact therewith is diverted in a direction towards the oil entrance port 50 in the bearing. It then flows through axial groove 52 for distribution in that radial space between the journal and bearing shell surfaces. Since the oil over-flow outlet 54 is located opposite from the inlet, the oil is required to flow across the bearing thereby assuring complete lubrication of the parts. Any air entrapped in the system is vented to the atmosphere through chamber 84 and passageway 90 formed in the upper bearing shell.

In view of the above, it will be apparent that many modifications and variations are possible in light of the above teachings. It is not necessary that the channel shaped diverter assume the exact configuration shown so long as it performs the function of channeling the oil lubricant in a direction circumferentially and upwardly and in a uniform path to the uppermost part of the bearing. Obviously, many designs of scrapers and diverters will occur to those skilled in the art since their only function is that of wiping oil from the disc and gathering that oil flowing upwardly in contact with the inner surface of the pedestal housing for delivery to the bearing entrance port. Since the parts are amenable to different configurations and designs, many different designs will occur to those skilled in the art. It therefore is to be understood that within the scope of the appended claims the invention may be practiced other than as specifically described.

What I claim as new and desire to secure by Letters Patent of the United States is:

1. A self-lubricating bearing comprising
   a pedestal having a shaft extending axially therethrough,
   seal means on opposite ends of said pedestal for preventing leakage of oil from the pedestal when the shaft is rotating,
   bearing shells in said pedestal coacting with the journal surface to form a journal bearing for the shaft,
   means on said shaft designed for immersion in an oil reservoir when the shaft is rotating,
   a device attached to the pedestal and coacting with said shaft means for causing oil picked up by said means during shaft rotation to move circumferentially and upwardly in a uniform flow pattern to the top of the pedestal, said device comprising a continuous channel shaped member in said reservoir and having a bottom thereof spaced from said pedestal and said channel shaped member spaced from and concentric with said shaft means,
   means in said pedestal positioned near the top of said bearing for diverting oil carried upwardly by said shaft means for delivery to a port communicating with a passageway in said bearing, and
   an outlet in said bearing for permitting the return of oil from the bearing to the sump.

2. A self-lubricating bearing comprising
   a pedestal having a shaft extending axially therethrough,
   a journal surface on said shaft and means adjacent opposite ends of said pedestal and coacting with said shaft for preventing leakage of oil from the pedestal,
   a pair of shells concentrically disposed around said journal for forming a bearing for the shaft,
   a disc attached to said shaft and of a size sufficient for immersion to a predetermined depth in oil in the sump of said pedestal,
   a diverter comprising a continuous channel shaped member the bottom portion of which is positioned near the bottom of and spaced from said pedestal but disposed concentrically with a portion of said disc and coacting with said disc for directing oil upwardly in a uniform flow pattern to the top of said pedestal,
   oil removal and directing means near the top of said bearing for removing oil from said disc and directing it into a port communicating with the relatively rotating parts in said bearing, and
   means for draining the oil in said bearing to the pedestal sump.

3. A self-lubricating journal bearing comprising
   a pedestal having a shaft extending axially therethrough,
   a journal surface on said shaft and a pair of bearing shells disposed concentrically therewith for forming a bearing for the shaft,
   seal means on opposite ends of said pedestal and coacting with said shaft for preventing leakage of oil from the pedestal,
   projecting means on said shaft adjacent one end of said journal surface and of a size sufficient to be immersed in oil provided in a sump in said pedestal,
   an oil directing device in said pedestal coacting with said projecting means for delivering oil in a uniform flow pattern to the top of said bearings,
   a scraper loosely mounted on the top of said disc and baffle means attached to the inner surface of said pedestal adjacent said scraper arranged for coaction with said scraper for removing oil from said projecting means and the inner surface on said pedestal and directing it to a bearing inlet port in said bearing, and means in said bearing for assuring the flow of oil thereacross prior to being discharged therefrom on a side opposite from the inlet port to the pedestal sump.

4. A self-lubricating journal bearing comprising a pedestal having a shaft extending axially therethrough, a journal surface on said shaft, and means coacting with opposite ends of said pedestal and said shaft for preventing leakage of oil from the pedestal during shaft operation, bearing shells concentrically disposed around said journal surface and designed for coaction therewith to provide a bearing for the shaft, an outwardly projecting disc on said shaft coacting with an oil diverter mounted in said pedestal for delivering oil in a uniform flow pattern upwardly to the top of said bearing, a Y-shaped scraper device mounted on said disc and having its legs extending thereacross and with a portion thereof terminating above an oil inlet port to said bearing, a diverter baffle positioned on opposite sides of said Y-shaped scraper device and mounted on the inner surface of said pedestal, the arrangement being such that the scraper and baffles remove oil from said disc and direct it toward said inlet port for delivery to said bearing, and an oil outlet in said bearing for returning oil circulating therethrough to said sump.

5. The combination according to claim 4 wherein said Y-shaped scraper is movably mounted on said disc, stop means on said bearing coacting with said scraper for limiting its circumferential movement on said disc, and said stop means being positioned such that said scraper may assume one of two positions depending on the direction of rotation of said shaft.

6. The combination according to claim 4 wherein said baffles located on opposite sides of the Y-shaped scraper are positioned at an angle substantially the same as the scraper legs for directing oil to said inlet port.

7. A self-lubricating bearing comprising a pedestal having a shaft extending axially therethrough, a journal surface on said shaft and means coacting with said pedestal and said shaft for preventing the leakage of oil from the pedestal, a pair of bearing shells concentrically disposed around said journal surface for providing a bearing for the shaft, a disc projecting outwardly from said shaft and adjacent said journal and of the size sufficient for partial immersion in oil provided in the sump of said pedestal, scraper and diverter baffle means located near the top of said bearing for removing oil from said disc and directing it to an inlet port provided in said bearing, and an air separation chamber formed near the top of the upper bearing shell and communicating with a passageway extending to the atmosphere for venting air entrapped in said bearing to the atmosphere.

References Cited by the Examiner

UNITED STATES PATENTS

| | | | |
|---|---|---|---|
| 1,003,868 | 5/1911 | Brown | 308—245 |
| 1,096,298 | 5/1914 | Garber | 308—127 |
| 1,400,168 | 12/1921 | Kingsbury | 308—160 |
| 1,561,076 | 11/1925 | Heitman et al. | 308—127 |

MARTIN P. SCHWADRON, *Primary Examiner.*

FRANK SUSKO, *Examiner.*